United States Patent
Hsiao et al.

[11] Patent Number: 6,129,231
[45] Date of Patent: Oct. 10, 2000

[54] MULTIPLE BOX CASE WITH CONTINUOUSLY ADJUSTABLE SAFETY SLIDER

[76] Inventors: John Hsiao, 105 N. Houser Dr., Covina, Calif. 91706; Mario Montano, 1038 Craig Dr., West Covina, Calif. 91790; Alfred R. Navarro, 2031 Via Burton, Suite F, Anaheim, Calif. 92806

[21] Appl. No.: 09/225,818

[22] Filed: Jun. 17, 1998

Related U.S. Application Data

[63] Continuation-in-part of application No. 08/928,551, Sep. 12, 1997, abandoned, which is a continuation of application No. 08/489,536, Jun. 12, 1995, abandoned.

[51] Int. Cl.[7] .......................... B65D 43/20; B65D 43/22; B65D 45/16
[52] U.S. Cl. ................... 220/345.2; 220/4.24; 220/4.27; 220/324; 220/345.4
[58] Field of Search .................. 220/4.26, 4.27, 220/4.33, 4.21, 4.24, 521, 324, 345.2, 349, 345.4, 345.1, 4.02, 315

[56] References Cited

U.S. PATENT DOCUMENTS

| | | | |
|---|---|---|---|
| 3,869,180 | 3/1975 | Sonaerat | 308/180 |
| 3,951,472 | 4/1976 | Schueger et al. | 308/6 |
| 4,480,880 | 11/1984 | Cather | 308/6 |
| 4,522,454 | 6/1985 | Hochutatter | 303/3 |
| 4,880,317 | 11/1989 | Teremachi | 384/45 |
| 5,209,572 | 5/1993 | Jordan | 384/18 |
| 5,275,492 | 1/1994 | Shirai | 384/15 |
| 5,344,228 | 9/1994 | Kovarik et al. | 312/334.9 |

*Primary Examiner*—Stephen K. Cronin
*Assistant Examiner*—Niki M. Eloshway
*Attorney, Agent, or Firm*—Charles C.H. Wu; Charles C.H. Wu & Associates, APC

[57] ABSTRACT

A multiple box case for housing audio equipment in both a transport and an operating mode is disclosed. An upper box has six latches extending downward to engage two continuous slider members fastened to a lower box to secure the case in the transport or closed mode. In an open or operating position, the upper box is cantilevered over the rear of the lower box and four of the six latches engage the two slider members in an operator preferred one of a plurality of continuously selectable positions. A safety stop bolt is installed in each slider member so as to preclude unstable positioning of the upper box.

8 Claims, 2 Drawing Sheets

# MULTIPLE BOX CASE WITH CONTINUOUSLY ADJUSTABLE SAFETY SLIDER

This application is a continuation in part of Ser. No. 08/928,551 filed Sep. 12, 1997, abandoned which is a continuation of Ser. No. 08/489,536 filed Jun. 12, 1995 abandoned.

BACKGROUND

1. Field of the Invention

The present invention relates generally to multiple box cases for housing electronic and acoustical equipment for transport and operation, and more particularly to apparatus for safely and adjustably joining the separate boxes of such a multiple box case.

2. Description of Related Art

Equipment cases that transport, for example, audio devices have long been designed to permit full operation of such devices without removing a device from its case. This is accomplished by structuring the case in, say, two device-containing boxes, one of which is then offset from the other in an operating position to reveal the elements of said devices or equipment for access by an operator.

Widely used in the field of the personal delivery of recorded music to audiences by, for example, on-location disc jockeys, such multiple box cases have traditionally permitted an operator the choice between two and only two stable modes. In the first of these, the transport mode, the upper box of the case is mated with the lower box, usually by a small number of hook and latch fasteners, typically two on each of two opposing sides, each latch engaging only one transport hook. The equipment within each case box is generally hidden from view and thereby protected for transportation.

In the other of the two states, viz., the operating mode, the latches on the upper box of the case are disengaged from the lower box transport hooks, and the upper box is repositioned to overhang the lower box in an offset and cantilevered manner in order to expose the equipment in that lower box for operation.

The precise position of the offset upper box is determined and limited by the location of two fixed operating hooks on the lower box, each of which operating hook is situated between the transport hooks on a side of the lower case box, and, in the operating mode, is designed to engage the frontmost of the latches on the corresponding side of the upper box.

An example of the foregoing traditional multiple box case is the Genesis ST-17A, a 17 space DJ case sold by Genesis of Los Angeles, Calif. An upper box of the case is offset by approximately one-half its depth to achieve an operating position that is limited to the discrete location allowed by the placement of the operating hooks. These hooks are fastened, one on each side of the lower box, approximately midway between the two transport hooks. For each side, the frontmost latch, the one that had engaged the frontmost transport hook in the transport mode, now engages the operating hook, while the other (rearmost) latch has nothing to engage, being located on that portion of the upper box that is cantilevered out from the lower box. The operator is thus restricted to a single, fixed operating position. Moreover, relying on such a single point of contact on each side of a case to secure a heavy case box may result in undesirable and potentially dangerous loss of stability should any such contact point fail.

A more versatile arrangement, allowing for enhanced flexibility in the location of the upper box in the operating mode, is embodied in, for example, the Odyssey SS-1702 DJ case sold by Odyssey Designs of Baldwin Park, Calif. A channel or slider member is mounted along the top of each of the sides of the lower box, essentially extending over most of the depth of each side. The slider member, which serves as a continuous "hook" for both transport and operation, permits the operator to choose a variety of operating positions by positioning the frontmost of the latches on the upper box to engage the lower box member anywhere along its entire length. The operator may thus adjust the position of the upper box to suit his or her personal preference. However, as in the Genesis design described above, only a single point of contact, viz., the frontmost latch on each side of the upper case, is being relied on for securing the boxes to each other. Moreover, the greatly extended length of the slider member may in fact contribute to an increased likelihood of the case tipping over should the operator offset the upper box too far to the rear of the lower box.

Other devices related to moving a box-like article relative to other parts in an assembly include a variety of complex devices employing roller bearings and races. For example, U.S. Pat. No. 5,275,492 to Shirai teaches a slide unit mounted on a guide rail by rolling members and requiring grease nipples for lubrication. Similarly, U.S. Pat. No. 5,344,228 to Kovarik et al. teaches an arrangement of channel members, four separate sets of ball bearings, an intermediate slide member and first and second raceways to facilitate movement of a drawer relative to a stationary base.

Accordingly, it is an object of the present invention to provide a case for transporting and operating electrical and acoustic equipment that overcomes the cost and safety problems that are characteristic of the prior art.

It is a further object of this invention to provide an equipment case that is more secure than conventional cases in a transport mode, and which permits the operator a comfortable degree of continuous adjustment in operating position to suit his or her own preference, while maintaining a safe and stable arrangement of the case in the operating mode.

SUMMARY OF THE INVENTION

A case for housing audio equipment during both transportation and operation has a lower box and an upper box that may be shifted rearward along the lower box to expose the equipment devices in the lower box for operation. A slider member having an outwardly projecting angled flange is mounted along the upper edge of each side surface of the lower box, and three latches are mounted along the lower edge of each side surface of the upper box for engaging the slider member in a closed or transport position.

According to one aspect of the present invention, first and second such side surface latches are located approximately one half inch apart and adjacent to the front surface of the upper box, while a third such latch is located adjacent to the rear surface of the upper box.

When the latches are disengaged and the upper box is shifted rearward, the continuity of the slider member allows the first and second latches to maintain loose contact with the member along its length, thereby permitting an operator to select from a variety of positions to suit his or her preference. Although the third latch no longer contacts the slider member at any point, the first and second latches are in position to re-engage the slider member when the operator's preferred position is reached, providing the substantially secure contact of double latches on each side of the case.

According to another aspect of the invention, the slider member has a linear series of threaded safety stop holes tapped below and parallel to the flange portion of the member. A safety stop bolt that has been threaded into a preselected one of such holes is sufficiently close to the member flange that a latch tongue is prevented from slipping between the bolt head and the member flange.

The particular safety stop hole that receives the bolt is preselected by sliding the upper box rearward until the case becomes unstable, that is, begins to tip from the weight and moment of the upper box about the lower box. The bolt is then installed in that safety stop hole that is nearest to the rear of the second latch position when the upper box is returned forward to the nearest formerly stable position.

These and other features of the present invention will become apparent from the following Detailed Description of an Exemplary Embodiment when taken in conjunction with the claims and drawing figures herein described.

BRIEF DESCRIPTION OF THE DRAWING FIGURES

DETAILED DESCRIPTION OF AN EXEMPLARY EMBODIMENT

Figure 1:
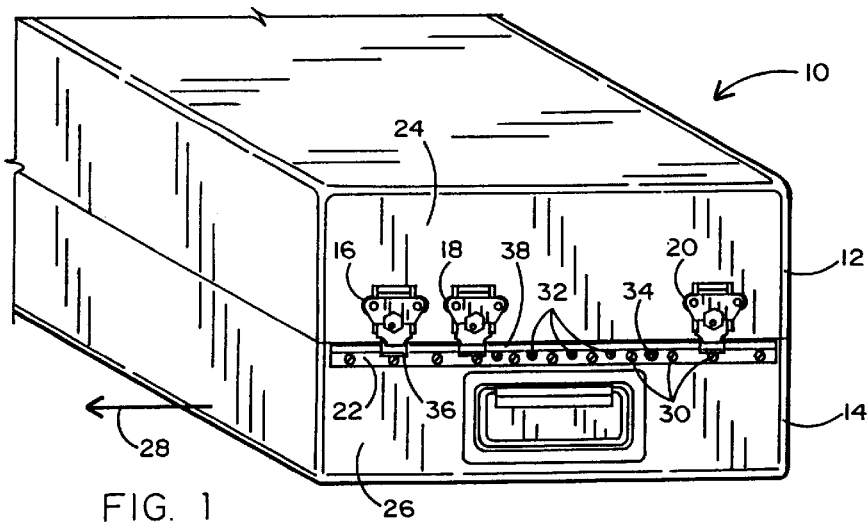
FIG. 1 is a perspective view of a multiple box case in the transport mode illustrating the principles of the present invention.

An improved equipment case 10 for transporting and operating audio devices for disc jockeys and the like is shown in FIG. 1. The present invention relates to apparatus for securely closing the equipment case 10 in a transport mode, and for safely exposing the devices in a lower box 14 in an operating mode. Access to devices in an upper box 12 is typically gained through one or more panels on the surfaces of the upper box 12 as is well known in the art, the placement of which doors is not critical with respect to the present invention.

Transport Mode

The upper box 12 is supported above the lower box 14 in a closed or transport mode. The boxes 12,14 are held securely together when being transported from place to place by latches 16,18,20 fastened to upper box 12 adjacent to a lower edge 13 thereof. The latches 16, 18, and 20, each having a tongue 36 capable of moving inward and outward into and out from the latches 16, 18, and 20. While the upper box 12 is in the closed or transport mode, the tongues 36 are in engagement with the slider member 22. By sliding inward into the latches 16, 18, and 20, the tongues 36 engage in a tight secure position with the slider member 22. Thus, the latches 16, 18, and 20 lock the upper box 12 to the lower box 14. By sliding outward from the latches 16, 18 and 20, the tongues 36 are moved away from the slider member 22. Thus, the tongues 36 are no longer in contact with the slider member 22 and therefore, disengage from the slider member 22.

Although right side surfaces 24 and 26 of the upper and lower boxes, respectively, are shown for purposes of illustration, the discussion herein applies equally to the latches and slider member that are mounted on the left side surfaces (not shown) of the boxes 12,14.

Figure 6:
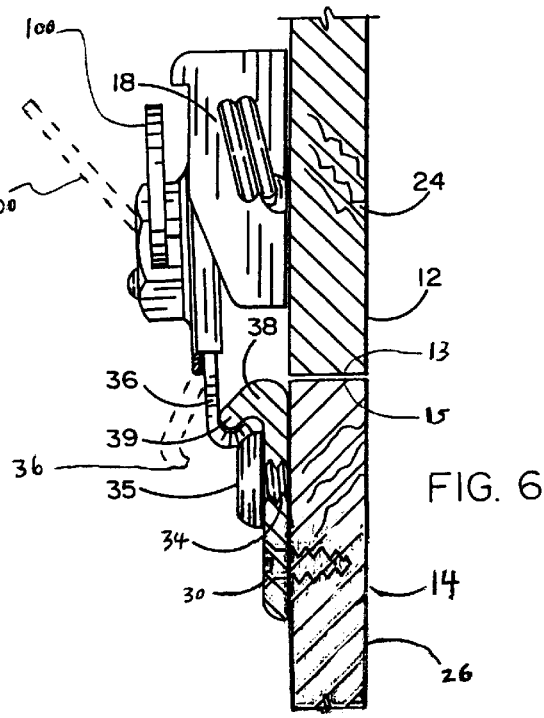
FIG. 6 is section view of a latch and slider member taken along line 6—6 of FIG. 2 and illustrating a safety stop bolt in place.

First latch 16, the frontmost latch, is disposed in close proximity to second latch 18, both latches being located in engagement near the forward end of slider member 22, indicated in FIG. 1 by forward arrow 28. Third latch 20 is remote from first and second latches 16,18 near the opposite or rear end of slider member 22. All of the latches 16,18,20 and the corresponding latches (not shown) mounted on the left side surfaces are in a locked or engaged condition as illustrated in FIG. 6. When the latches 16,18,20 are thus positioned on the slider 22 as shown in FIG. 1, the equipment case 10 is thereby locked in the transport mode.

Mounting fasteners 30 secure slider member 22 to the side 26 of box 14. Safety stop threaded holes 32 and safety bolt 34 are shown for completeness in FIG. 1 and will be discussed in detail in the Operating Mode section of this Description.

Figure 4:
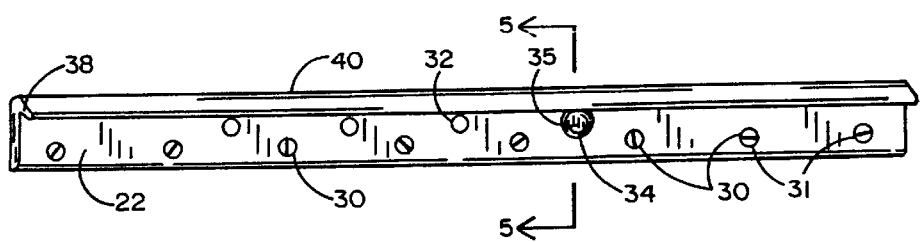
FIG. 4 is a perspective view of the slider member of the present invention illustrating relative locations of mounting fasteners and safety stop holes.
Figure 5:
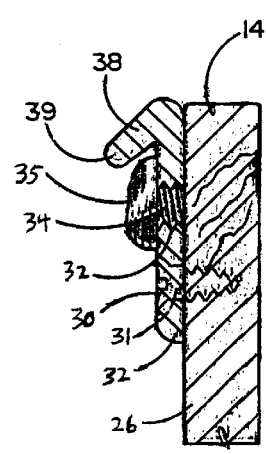
FIG. 5 is a section view of the slider member taken along lines 5—5 of FIG. 4.

The configuration of slider member 22 is more clearly seen in FIGS. 4 and 5. The material of slider member 22 may consist of extruded aluminum or other light, strong material that can be affixed to a side 26 of the lower box 14 by mounting fasteners indicated by reference numeral 30. Fasteners 30 are preferably flathead screws that are inserted through countersunk mounting holes 31 and driven into the material, e.g., wood, of side 26.

The continuous flange 38 projects downwardly from the upper edge 40 of the slider member 22, preferably at an angle of approximately 30°. A linear series of threaded holes 32, either blind or, if more economical, tapped through the slider member 22, is disposed parallel to the flange 28 for receiving a safety stop bolt 34 to be described in conjunction with FIGS. 2 and 6 in the Operating Mode section of this Description below. The series of holes 32 is arranged about the midpoint of slider member 22, and extends essentially over the middle third of the slider member.

FIG. 5 illustrates the angular relationship between slider member 22 and flange 38, and depicts the preferred placements of mounting fasteners 30 and threaded holes 32 for the present embodiment.

Operating Mode

The upper box 12 has a cavity 42 for mounting audio equipment. The audio equipment is typically permanently mounted in the cavity 42 during the assembly stage. Thus, the cavity 42 typically cannot be used for other purposes.

In order to prepare audio equipment case 10 for safe adjustment by an operator, a safe limit of travel for upper box 12 is predetermined, either by a supplying source of the case 10 or by the operator in the field prior to putting the case to its intended use. Such predetermination involves establishing an extreme position for upper box 12 as it overhangs lower box 14 in an operating position, and then installing means to insure that box 12 is not placed beyond such extreme position if operated normally.

The series of safety stop holes 32 shown in FIG. 4 are tapped into sliding member 22 in proximity to upper edge 40 to accommodate a safety stop bolt 34 (FIGS. 1,5 and 6) in one such hole 32. The longitudinal axis of each hole 32 is aligned slightly below the outer lip 39 of flange 38 so that the head 35 of safety stop bolt 34 when installed in a hole 32 as seen in FIG. 6 is sufficiently close to flange lip 39 that tongue 36 of a latch 18 is unable to pass between bolt head 35 and flange lip 39.

Figure 2:
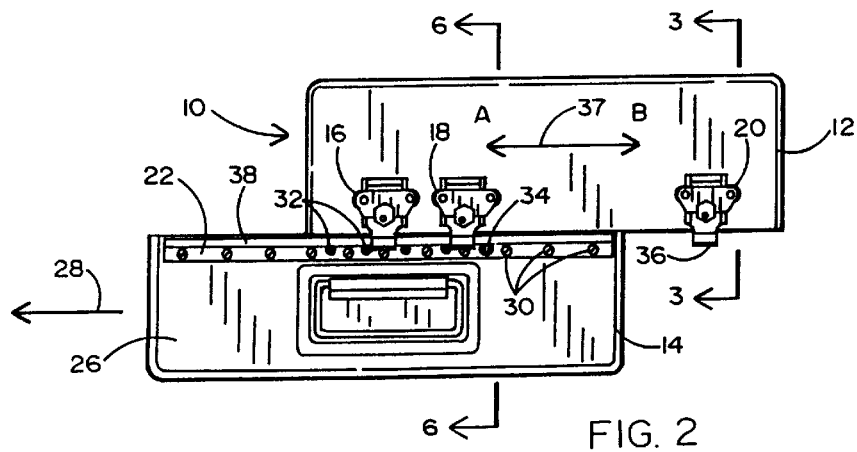
FIG. 2 is a side elevation view illustrating the multiple box case of FIG. 1 in an operating mode.

To determine which of the safety stop holes 32 is to receive safety stop bolt 34 the lower edge 13 of, upper box 12 is moved along the upper edge 15 of lower box 14 to the rear as shown in FIG. 2 by directional arrow 37, direction B. Safety stop bolt 34 is not yet installed. Tongue 36 of second latch 18 is allowed to slide in loose engagement with slider member flange 38. Depending on the weight and relative positioning of the audio equipment (not shown) in each box 12,14, there will be a critical point at which the rotational moment of upper box 12 about lower box 14 causes box 12 to begin to tip case 10 to the rear. When that critical point is reached, upper box 12 is returned in a forward direction (direction A of directional arrow 37) until tongue 36 of second latch 18 is forward of the nearest safety stop hole 32. Safety stop bolt 34 is then threaded into that nearest hole 32 so that bolt head 35 forms an effective barrier to the travel rearward of tongue 36 of second latch 18. An operator need not change the location of safety stop bolt 34 unless changes to the audio equipment significantly alter the weight or moments of the boxes 12, 14.

To quickly and easily assemble a case 10 for performance, the operator merely disengages the three latches 16,18,20 on each side of upper box 12, allowing each latch tongue 36 to be free of contact with flange 38 of slider member 22 as box 12 is shifted back along lower box 14 in the direction B of arrow 37 in FIG. 2. The latches 16, 18, 20 are disengaged by rotating the butterfly plate 100 to an extreme counterclockwise position as shown by shadow lines in FIG. 6, causing the tongue 36 to effect an extended position, breaking contact with the slider flange 38.

Since slider member 22 is continuous, the operator may select a precise position for the case 10 boxes without having to settle for a compromise position imposed by a traditionally configured discrete hook and latch arrangement.

Figure 3:
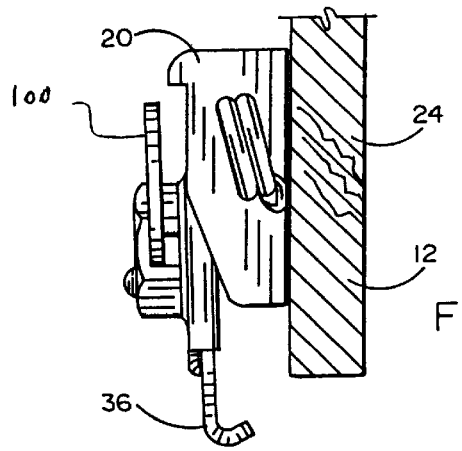
FIG. 3 is a partial enlarged section view taken along line 3—3 of FIG. 2 showing a transport latch disengaged from a slider member.

Once the operator's ideal position for upper box 12 is selected, first and second latches 16,18 are actuated so that the tongues 36 on latches 16,18 grip sliding member 22 in tight engagement. Third latch 20 is in non-engagement with slider member 22, as illustrated in FIG. 3, just as in a conventional discrete latch configuration, but security is enhanced over the traditional devices by the presence of four latches firmly gripping two slider members on the left and right sides of case 10. Additionally, operator concerns about stability are greatly lessened, since safety stop bolt 34 precludes the danger of shifting upper box 12 rearward beyond a safe travel distance.

Although an exemplary embodiment of the invention has been described for the purposes of illustrating the features thereof, it will be understood that the scope of the invention is limited only by the following claims presented herein.

What is claimed is:

1. A multiple box case for housing audio equipment in a closed transport mode position and an open operating mode position, said case having a forward and a rearward aspect and comprising:

a lower box having an open top and a side edge defining a border of said top on each of two side surfaces, said box containing at least one audio equipment device;

at least one upper box having a bottom surface and a side edge defining a border of said bottom surface on each of two side surfaces of said upper box, said upper box containing at least one audio equipment device capable of operating with said lower box device;

a slider member fastened adjacent to and parallel with each said lower box side edge, said slider member having a continuous outward projecting flange being formed along and in an acute angle relationship with an upper rim thereof, and having at least one threaded safety stop hole tapped therein, said hole disposed below and opposing said continuous flange;

at least three latches fastened adjacent to each said upper box side edge and extending downward to releasably engage a respective one of said lower box slider members, such that at least the two frontmost said latches on each said upper box side are disposed forward of at least the rearmost of said safety stop holes when said latches are engaged with said slider member; and a safety stop bolt threadably engaged in one said threaded safety stop hole on each said lower box side member, said bolt having a bolt head in sufficient proximity to respective said member flange as to preclude the rearmost of said two frontmost latches from being advanced to the rear of said box along said slider member when said upper box side edges are shifted rearward in contact with said lower box side edges, from said transport mode position in a continuously variable path to said operating mode position.

2. The case of claim 1 wherein each said slider member extends along approximately the entire length of a respective said lower box side edge.

3. The case of claim 1 wherein a plurality of said threaded safety stop holes are arranged linearly and parallel to said continuous flange within each respective slider member.

4. The case of claim 3 wherein said linearly arranged threaded safety stop holes are distributed along a middle one-third length of said slider member.

5. The case of claim 1 wherein said slider member is approximately 14.5 inches in length.

6. The case of claim 5 wherein said two frontmost latches are spaced approximately one-half inch apart from one another.

7. A method for establishing a safe extreme position of an upper box in a multiple box case to facilitate transitioning of said case from a closed transport mode position to an open operating mode position, said method comprising the steps of:

providing an upper box having fastened adjacent to each lower side edge thereof a first latch, a second latch rearward of and adjacent to said first latch, and a third latch remote from said first and second latches toward the rear of said upper box;

providing a lower box below and supporting said upper box, said lower box having a slider member fastened adjacent to each upper side edge thereof, said member having a continuous flange projecting therefrom and a plurality of safety stop holes tapped therein;

shifting said upper box lower side edge in a rearward direction along said lower box upper side edge in a continuously variable path until said case begins to exhibit a tendency to tip to the rear;

returning said upper box in a forward direction along said lower box so that said second latch is forward of a nearest said safety stop hole; and installing a safety stop bolt in said nearest safety stop hole to establish said safe extreme operating position.

8. For a multiple box case having an upper box and a lower box, said case housing audio equipment, a method for adjusting said boxes from a closed transport position to an open operating position to suit an operator's preference, said method comprising the steps of:

providing an upper box having fastened adjacent to each lower side edge thereof a first latch, a second latch rearward of and adjacent to said first latch, and a third latch remote from said first and second latches toward the rear of said upper box;

providing a lower box having a slider member fastened adjacent to each upper side edge thereof, said member having a continuous flange projecting therefrom and a safety stop bolt installed therein, said latches being engaged with said slider member in a transport mode;

releasing said latches from engagement with said slider member in said closed position;

shifting said upper box along said lower box in a rearward direction in a continuously variable path within a limit of travel determined by said safety stop bolt until said audio equipment in said lower box is exposed to the satisfaction of said operator to constitute an operating mode position; and engaging said first and second latches to said slider member, thereby securing said upper box in said operating position.

* * * * *